Sept. 24, 1929.  J. S. THOMPSON  1,729,139
FRICTION BRAKE
Filed March 3, 1926  2 Sheets-Sheet 1
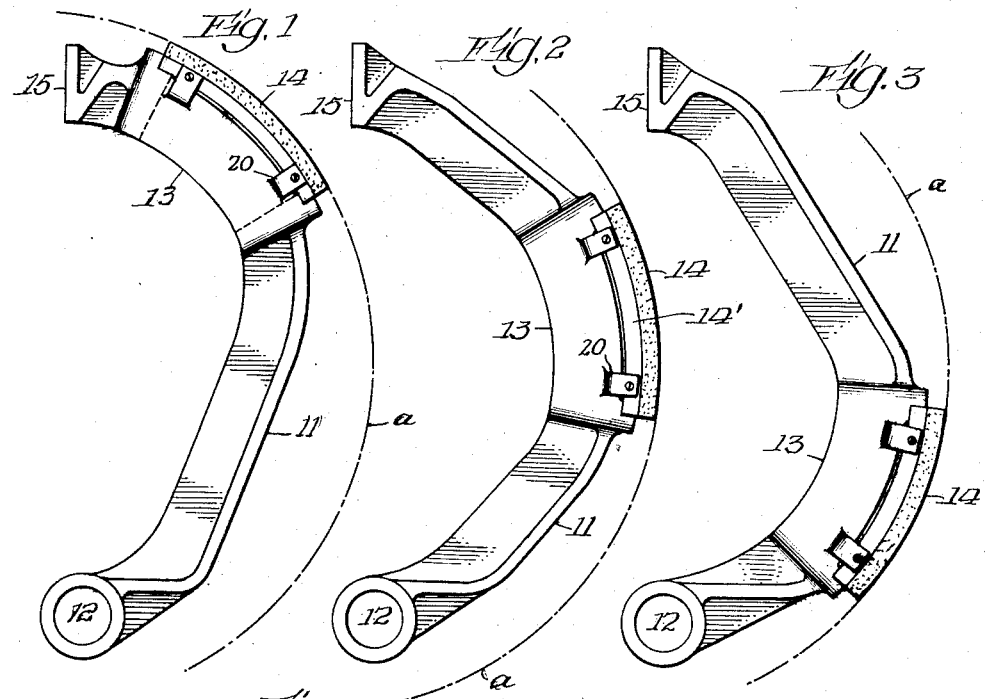
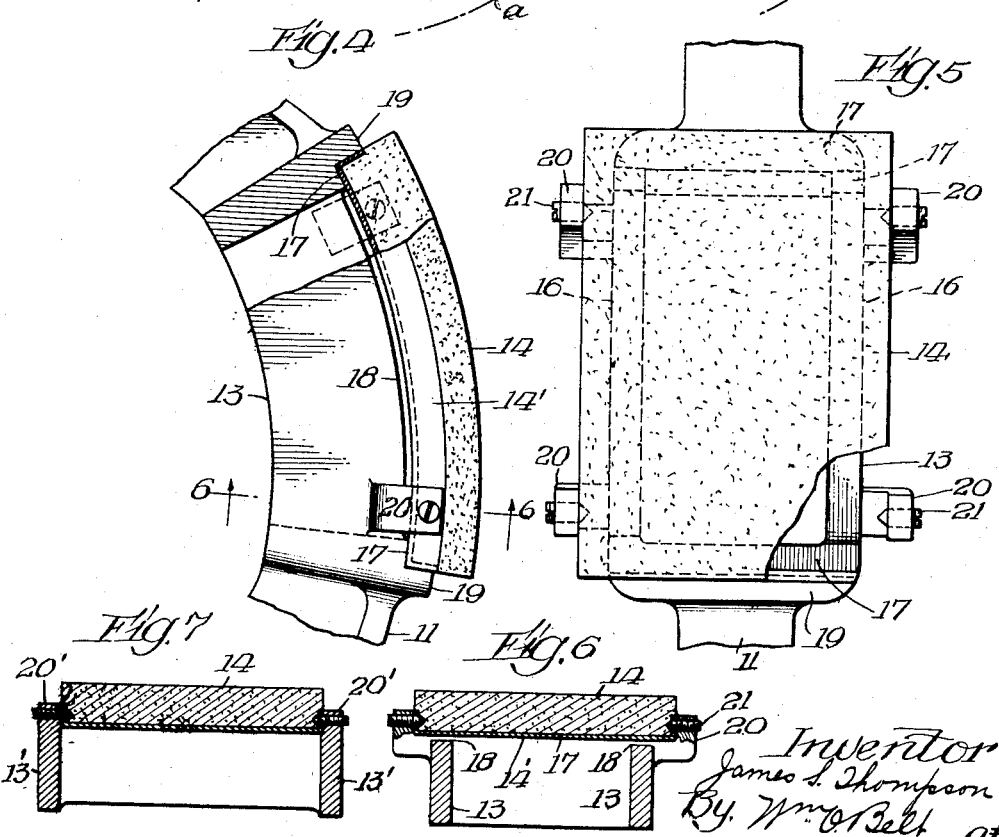

Sept. 24, 1929.　　　J. S. THOMPSON　　　1,729,139
FRICTION BRAKE
Filed March 3, 1926　　2 Sheets-Sheet 2
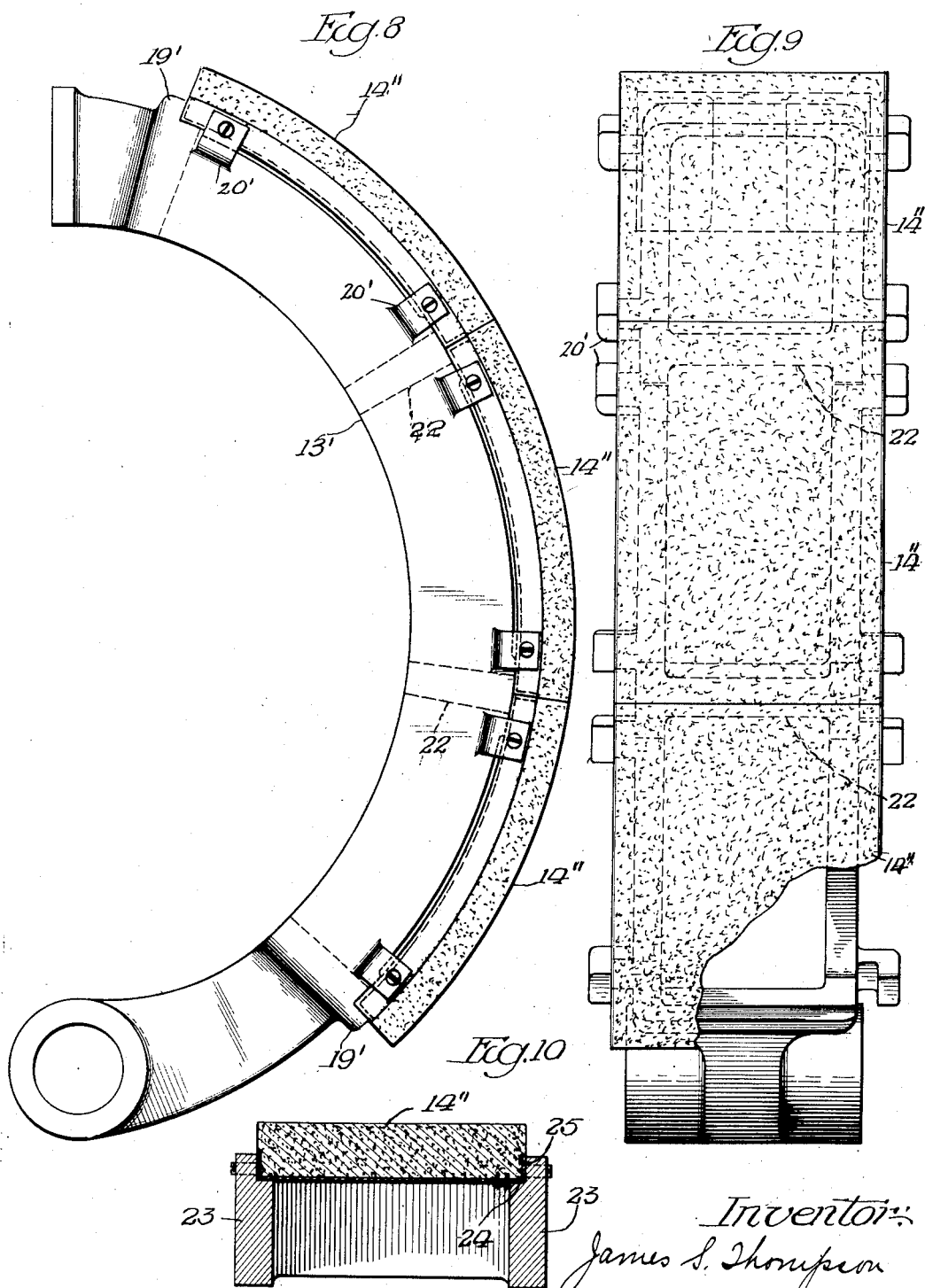

Patented Sept. 24, 1929

1,729,139

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed March 3, 1926. Serial No. 92,049.

This invention relates to friction brakes and while it is particularly adapted for expanding brakes arranged to make frictional contact with a drum, which is a form of brake commonly employed in automotive vehicles, it is also useful in many other installations as will be apparent to those skilled in the art.

The object of the invention is to provide a brake head of novel and simple construction, light in weight and skeleton in form, with means for easily securing a shoe or shoes detachably in place thereon.

A further object is to construct the head to form an efficient support for the shoe and to provide ventilation about the head and shoe for quickly dissipating the heat of friction.

And a further object is to provide means of simple character whereby the shoe may be secured in place upon the head without removing the head from the vehicle.

With these and other ends in view, which will be fully set forth in the detail description, I have illustrated the invention in a simple form in an expanding brake for automotive vehicles and referring thereto:

Figures 1, 2 and 3 illustrate heads having a shoe differently disposed thereon.

Fig. 4 is an enlarged sectional view of that portion of a head to which the shoe is applied.

Fig. 5 is a plan view of Fig. 4.

Fig. 6 is a sectional view on line 6—6 of Fig. 4.

Fig. 7 is a view similar to Fig. 6 showing another embodiment.

Fig. 8 shows a head carrying three shoes.

Fig. 9 is a plan view of Fig. 8.

Fig. 10 is a transverse sectional view showing another embodiment.

The head of Figs. 1–7 is skeleton in form and comprises an arm 11 having at one end an eye 12, a channel section 13 open from front to back and forming a seat for the shoe 14 and a free end 15. The eye is engaged with a stud of a brake assembly to pivotally mount the head within a brake drum (indicated by the broken line $a$), and means are provided, well known in brake assemblies, for swinging the head on its pivot to move the shoe into and out of operative contact with the drum. The arm is divided to form a channel or open seat having side members 16, 16 and transverse shoulders 17, 17. The side members are preferably recessed at 18 so that the shoe will engage the seat only at the shoulders 17, which may be made comparatively narrow. Instead of recessing the sides the same result may be obtained by raising the shoulders; and if it is preferred that the shoe shall have contact with its seat over a larger area the shoulders may be widened.

I provide stops 19, at the ends, and guides 20 at the sides of the seat, and I may secure the shoe on the seat by any suitable means such as bolts 21 threaded in the guides. The shoe may have recesses to receive the ends of the bolts or the bolts may simply be forced tightly against the shoe to hold it by friction.

In Fig. 7 I have shown the sides 13' wider than the shoe and all of the top of the sides, or only portions thereof, as preferred, extended to form side guides 20'. In this construction the shoe rests upon transverse shoulders as shown in Figs. 1–6.

I may make the head to receive an elongated shoe made in one or in a plurality of sections, if desired. In Figs. 8 and 9 I have shown a substantially semi-circular head, in all respects similar to the head of Figs. 1–3 except that the channel or open seat section 13' is elongated and provided with cross ribs 22. The shoe comprises three sections 14'', which are shown abutting at their adjacent ends. Obviously the head may be adapted for a shoe comprising two sections or more than three sections and the length of the sections may be made to suit required conditions. End stops 19' are located at the outer ends of the line of shoes, and side lugs 20' are disposed at the sides of the channel to receive the elongated sectional or one-piece shoe.

In Fig. 10 I have shown the sides 23 formed with shoulders 24 to receive the side portions of the shoe. In this construction I would prefer that portions only of the sides extend up to form guides 25 so that the greater part of the sides of the shoe will be exposed.

I may use a shoe of any kind suitable for the purpose, but I prefer to use a composition shoe with a back 14'.

My invention provides an efficient brake of simple construction, which will give satisfactory service on light vehicles and on heavy vehicles, and on vehicles carrying light loads or heavy loads. It is particularly adapted for automotive vehicles, which is an extensive field of use, but there are many other installations for which it is adapted and in which it will give satisfactory service. The skeleton head can be made light in weight and yet of sufficient strength and rigidity, and the fastening devices permit of the replacement of the shoe quickly and easily and without special skill.

The skeleton channel seat section of the head provides for the circulation of air about the head and the shoe which will ventilate the brake and reduce the accumulation of heat.

I may make changes in the construction and arrangement of parts to adapt my invention for different installations and to meet different conditions and I reserve the right to make all modifications and adaptations of the invention that may be covered by the following claims.

I claim:

1. A brake head comprising an arm having a section therein open from front to back with spaced sides providing a seat for a friction shoe, said sides being recessed at the top thereof.

2. A brake head comprising an arm having a section therein open from front to back, said section having spaced sides, recessed at the top thereof, and transverse members connecting the ends of the sides and providing a seat for a friction shoe.

3. A brake head comprising an arm having a section therein open from front to back to receive a friction shoe, said section having spaced sides, transverse members connecting the ends of the sides, and integral guides on the sides for engaging the friction shoe.

4. A brake head comprising an arm having a section therein open from front to back to receive a friction shoe, said section having spaced sides, and means on the sides of said open section engaging the sides of the shoe for securing the shoe on the head.

5. A brake head comprising an arm having a section therein open from front to back to receive a friction shoe, said section having spaced sides, and transverse means on said sides to engage the sides of the shoe for securing the shoe on the head.

6. A brake head comprising an arm having a section therein open from front to back to receive a friction shoe, said section having spaced sides, transverse members connecting the ends of the sides, and shoulders on said transverse members to engage and support the shoe.

7. A brake head comprising an arm having a section therein open from front to back to receive a friction shoe, said section comprising spaced sides, transverse members connecting the ends of said sides, and end stops and shoulders on said transverse members to engage the shoe at the ends thereof.

8. A brake head comprising an arm having a section therein open from front to back to receive a friction shoe, said section having spaced sides, transverse members connecting the ends of said sides, and end stops and shoulders on said transverse members and guides on said sides to engage the shoe.

9. A brake head comprising an arm having a section therein open from front to back to receive a friction shoe, said section having spaced sides, guides on said sides, and means carried by said guides for securing the shoe on the head.

10. The combination of a brake head having a section therein open from front to back, a friction shoe comprising a plurality of sections arranged with their adjacent ends abutting on said open section, and means for holding said shoe sections in place on the head.

11. The combination of a brake head having a channel section therein, a friction shoe comprising a plurality of sections arranged end to end with their adjacent ends abutting on said channel section, and means for holding said shoe in place on the head.

12. The combination of a brake head having a channel section therein, a friction shoe comprising a plurality of sections arranged end to end with their adjacent ends abutting on said channel section, stops on the head to engage the ends of said shoe, guides at the sides of said section to engage the sides of the shoe, and means carried by said guides for securing the shoe on the head.

13. A brake head comprising an arm having a channel section therein recessed to provide a seat for a friction shoe, the end walls of said seat providing integral retaining means to engage the ends of the shoe.

14. A brake head comprising an arm having a channel section therein recessed to provide a seat for a friction shoe, said section having spaced sides and spaced transverse members connecting the ends of the sides, the end walls of said seat being located on said transverse members and forming integral retaining means to engage the ends of the shoe.

15. A brake head comprising an arm having a recessed seat for a friction shoe, and retaining means at the sides of said seat to engage the sides of the shoe.

JAMES S. THOMPSON.